United States Patent [19]

Reed et al.

[11] 3,887,874

[45] June 3, 1975

[54] LOW PASS FILTER APPARATUS

[75] Inventors: Thomas D. Reed, Plano; Wayne A. Winget, Richardson, both of Tex.

[73] Assignee: Rockwell International Corporation, El Segundo, Calif.

[22] Filed: May 10, 1974

[21] Appl. No.: 468,777

[52] U.S. Cl. .............................. 328/167; 333/70 T

[51] Int. Cl.[2] .............................. H03B 1/04

[58] Field of Search .......... 328/167; 333/70 A, 70 T

[56] References Cited

UNITED STATES PATENTS

| | | | |
|---|---|---|---|
| 2,339,633 | 1/1944 | Gilman | 328/167 UX |
| 3,019,296 | 1/1962 | Schelleng | 333/70 A UX |
| 3,081,434 | 3/1963 | Sandberg | 333/70 T UX |
| 3,505,607 | 4/1970 | Van Gerwen et al. | 328/167 |
| 3,628,163 | 12/1971 | Heibel | 328/167 |
| 3,706,054 | 12/1972 | Starr et al. | 333/70 T X |

OTHER PUBLICATIONS

Lerner, "Band-Pass Filters with Linear Phase," *Proceedings of the IEEE*, March, 1964, pp. 249–268.

*Primary Examiner*—James B. Mullins

*Attorney, Agent, or Firm*—Bruce C. Lutz

[57] ABSTRACT

The combination of a linear phase bandpass filter between a modulator and demodulator wherein the equivalent of a lowpass filter is produced by increasing the frequency of the signal to be lowpass filtered by carrier modulating it, bandpass filtering the increased frequency signal and demodulating the bandpass filtered signal to produce a lowpass filtered output having linear phase characteristics.

1 Claim, 2 Drawing Figures

LOW PASS FILTER APPARATUS

The present invention is generally concerned with electronics and is more specifically concerned with filters. Even more specifically, the present invention pertains to the method of obtaining a lowpass filter having linear phase characteristics while maintaining very steep skirts on the frequency response characteristics at the design frequency of the lowpass filter.

Prior art filters have generally resorted to Bessell functions for obtaining linear phase shift or constant phase shift characteristics of all frequency signals passing through a filter within a design range. A Bessell function filter does not have a sharp roll-off and thus many frequencies are passed, even though at a lower amplitude, than is desirable under many filtering operations. Bessell function filters can be designed for use either in lowpass situations or bandpass. A different type of filter, called Cauer or Chebishev, has a sharp skirt response and can also be designed in lowpass or bandpass configurations. However, the phase shift is not a constant value over the range of frequencies passed by the filter.

Finally, there is a filter called a transversal filter. Conventional filter networks, consisting of lumped inductances and capacitances are adequate for those filtering requirements where some phase distortion can be tolerated. In many cases, such as in television circuits, phase distortion must be avoided throughout the video frequency range (DC to 10 megahertz). The advantages of the transversal filters described here are that they show no phase distortion at all or that their phase varies slowly and steadily regardless of the amplitude response and the phase variation is therefore easily correctable. In lumped constant filtering phase correction circuits are capable of smooth and lasting compensation only in the ranges of reasonably steady phase response and cannot be phase corrected near limits of the passband where usually the phase changes are more violent as the amplitude cutoff becomes sharper. More details may be obtained as to a transversal filter in an article the *Proceedings of IEEE*, pages 249–268, March 1964. This article was written by Lerner. The transversal filter described by Lerner and others since this article was written provide constant or linear phase characteristics over the design frequency but transversal filters can only be designed for bandpass operations. In other words, they cannot be used where the minimum frequency approaches d.c. Therefore, the filter cannot be used as a lowpass filter. The transversal filter does have a Cauer-like frequency response and it would therefore be desirable to use this linear phase filter having the very sharp skirts to provide lowpass filtering operations.

The present inventive concept utilizes a transversal filter after the frequency to be lowpass filtered is raised in frequency through modulation by a carrier. After filtering, the filtered signal is demodulated through the use of the same carrier to produce the original signal minus all frequency components above a given design frequency as determined by the frequency limits of the bandpass filter from the center of carrier frequency design.

It is, therefore, an object of the present invention to provide an improved lowpass filter having linear phase characteristics.

Other objects and advantages of the present invention may be ascertained from a reading of the specification and claims in conjunction with the drawings wherein:

Figure 1:
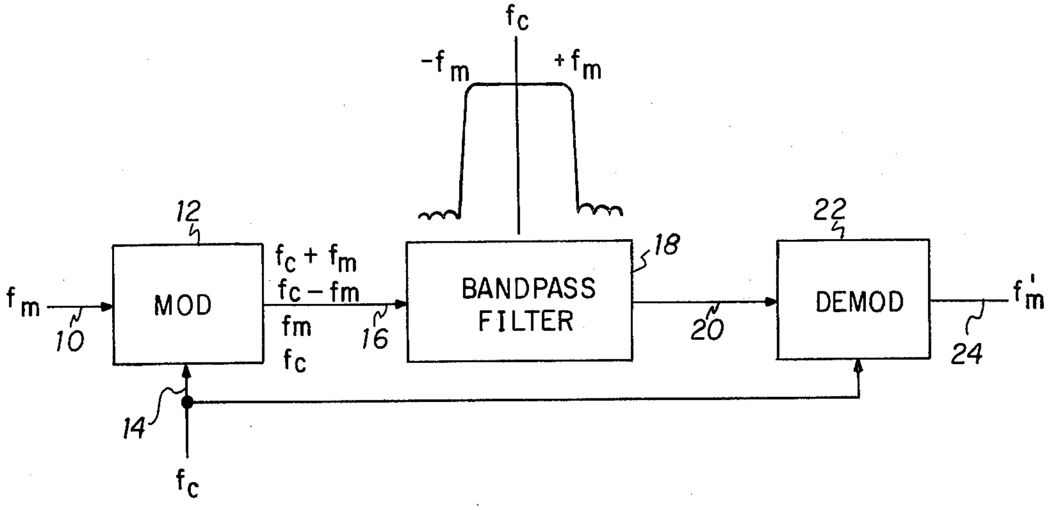
FIG. 1 is a block schematic diagram of the inventive concept.

In FIG. 1, an input lead 10 provides the signal to be filtered to a balanced modulator 12 having a second input lead 14. Input lead 14 provides a carrier frequency for modulating the signal appearing on lead 10. An output 16 of modulator 12 supplies the modulated signal to a bandpass filter 18. The signals on lead 16 comprise the sum of a carrier plus the frequency to be filtered, the difference frequency and the two frequencies $F_m$ and $F_c$, individually. The signals passed through the bandpass filter 18 appear on an output lead 20 as they are applied to a demodulator 22. The frequencies of these signals appearing on lead 20 are the same as those appearing on lead 16 except that all frequencies beyond the design frequency $F_m$ are substantially reduced in amplitude in accordance with the characteristics of the bandpass filter 18. The resultant signal on lead 20 is demodulated through the action of demodulating signal $F_c$ applied to 22 and reduced to the single range of frequencies $F_m$ on lead 24. $F'_m$ differs only from $F_m$ in that all frequencies greater than the frequency difference between $F_c$ and $F_m$ in the response illustrated above bandpass filter 18 are either nonexistent or substantially reduced in magnitude. By substantially reduced in magnitude, we mean that the amplitude of these signals having a frequency greater than the design of the bandpass filter 18 are in the neighborhood of 40 dB lower in magnitude than those signals having a frequency of less than the design frequency.

The modulator 12 may be exactly the same design as the demodulator 22 as is known to those skilled in the art and may be any of a plurality of double balanced modulators available to the public. Motorola produces one such unit with the designation MC 1496 while Fairchild produces another with the designation $\mu$A796.

Figure 2:
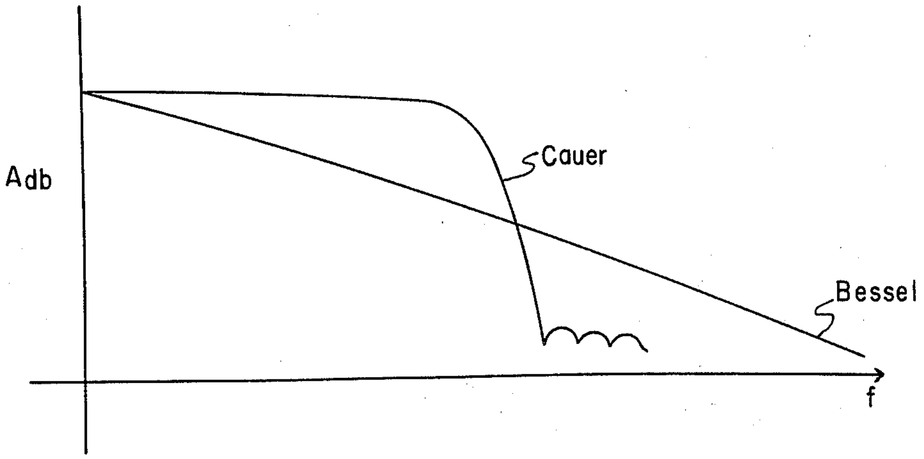
FIG. 2 is a representation of the frequency response curves of Cauer and Bessell function filters.

As previously indicated, the present inventive concept is a means whereby a lowpass filter operation can be performed having sharp cutoff skirts similar to that of Cauer lowpass filters as shown by the frequency response in FIG. 2 while having the linear phase characteristics of the Bessell lowpass filters. Since transversal filters are only bandpass filters and have a Cauer-like cutoff or frequency response, these devices have been used at their design frequency to produce the desired lowpass result by increasing the frequency to be filtered whereby the frequencies to be passed are within the design range of the transversal filter after which the signals are again reduced in frequency to product a lowpass filtered signal.

While we have illustrated one possible implementation of the inventive concept, we wish to be limited not by the specific embodiment illustrated by only by the scope of the appended claims wherein we claim:

1. A lowpass filter apparatus comprising, in combination:
   - input means for supplying a signal to be lowpass filtered;
   - apparatus output means for supplying lowpass frequency filtered signals;

bandpass transversal filter means having a frequency bandwidth of approximately twice the range of the range of frequencies to be lowpass filtered the phase shift through said filter means being substantially constant throughout the lowpass frequency design range; and double balanced modulator-demodulator means directly connecting said bandpass filter between said input means and said output means, said modulator means increasing the average frequency of signals to be filtered before being applied to said filter means and said demodulator means decreasing the average frequency before applying the signal received from the filter means to said apparatus output means.

* * * * *